United States Patent [19]

Erickson et al.

[11] Patent Number: 4,461,710
[45] Date of Patent: Jul. 24, 1984

[54] ADJUSTABLY METERED TRANSFER OF RESIN INCREMENTS IN FOLDED BED ION EXCHANGE SYSTEMS

[75] Inventors: William R. Erickson, Lakeland; Solon G. Whitney, Bartow, both of Fla.

[73] Assignee: American Petro Mart, Inc., Bartow, Fla.

[21] Appl. No.: 499,205

[22] Filed: May 31, 1983

[51] Int. Cl.³ .......................................... B01D 15/04
[52] U.S. Cl. .................................. 210/675; 210/189; 222/56; 222/438
[58] Field of Search ................ 210/675, 676, 97, 189, 210/350, 351; 222/56, 64, 438

[56] References Cited

U.S. PATENT DOCUMENTS

| | | | |
|---|---|---|---|
| 2,770,395 | 11/1956 | Sebardt | 222/438 |
| 3,180,825 | 4/1965 | Couvreur et al. | 210/350 |
| 3,627,555 | 12/1971 | Driscoll | 222/56 |
| 3,964,793 | 6/1976 | Volpeliere | 222/56 |
| 3,965,000 | 6/1976 | Mikule et al. | 210/351 |
| 4,385,993 | 5/1983 | Hedrick et al. | 210/675 |

Primary Examiner—Ivars C. Cintins

[57] ABSTRACT

Adjustably metered transfer of resin increments in folded bed ion exchange systems are provided by a method and apparatus in which compacted liquid-containing resin granules are expelled from a column into a metering chamber which is filled to a level of a granule-retaining screen, the cut-off of the granule filling being signaled by liquid moving through the screen to a control level thereabove and/or by an increase in the hydraulic pressure of the liquid below the screen. In preferred embodiments the measuring chamber is provided with a flexible wall which is positioned to either increase or decrease the volume of the measuring chamber and thereby selectively vary the volume of the granule increment captivated by the chamber. The invention provides for the pulsing of resin increments of precisely and adjustably metered volume, and provides a means for keeping the loading and regeneration sides of the system in resin transfer balance.

6 Claims, 2 Drawing Figures

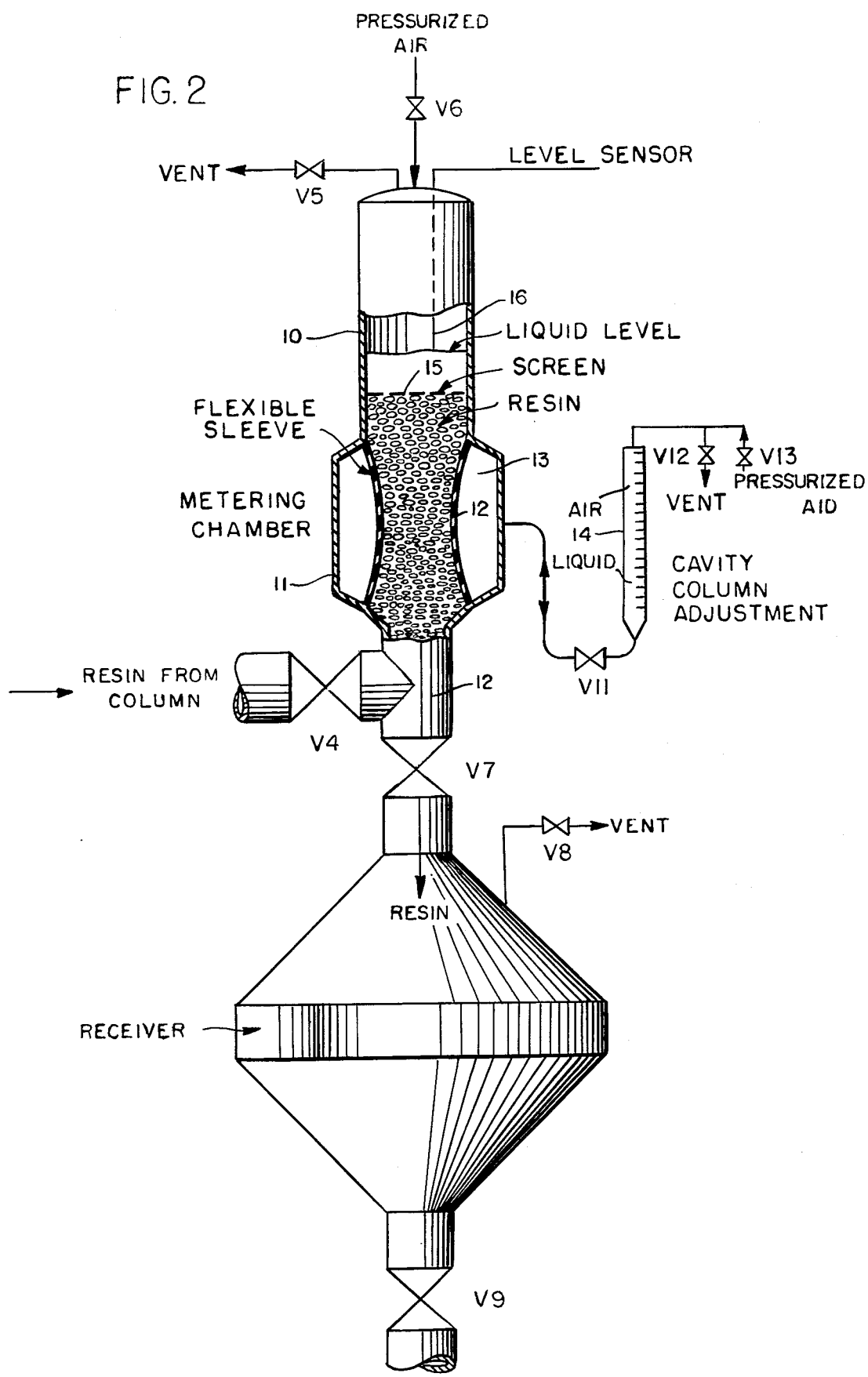

4,461,710

ADJUSTABLY METERED TRANSFER OF RESIN INCREMENTS IN FOLDED BED ION EXCHANGE SYSTEMS

BACKGROUND AND PRIOR ART

The field of this invention relates to ion exchange systems utilizing moving folded beds for loading and regeneration of the resin granules. More particularly, this invention relates to improvements in the metered transfer of resin increments as expelled from the loading and/or regeneration columns.

Higgins U.S. Pat. No. 2,815,322 is one of the earliest patents describing a moving folded bed ion exchange system. The resin is transferred around a continuous loop by means of hydraulic pulses. A columnar section of the loop provides a continuous bed, the upper portion of which is the loading section and the bottom portion the regeneration section. A freeboard space is provided at the top of the columnar section above the top of the resin bed, the level being controlled by a spill-over outlet which transfers resin to a receptacle section for return to the bottom of the regeneration section. Since all of the resin in the circuit is moved with each hydraulic pulse, there is an automatic metering or balancing of the transferred resin. Such an arrangement, however, provides no separation between the different sections of the loop so that liquids being processed in the loading section become contaminated with the liquids employed for regeneration. Also, movement of all of the resin with each pulse requires the use of relatively high pressures for the hydraulic pulses, and the resin granules during movement are subjected to undesirable frictional attrition, which shortens the useful life of the resin.

Later Higgins patents such as U.S. Pat. No. 3,579,322, disclose continuous loop systems in which sections of the loop are divided into separate compartments with valves between the compartments. As illustrated by U.S. Pat. No. 3,579,322 the pulsing of a resin increment into the bottom of the loading compartment causes the ejection of resin increment of corresponding volume from the top of the loading column into a receiver compartment. With this arrangement, only part of the resin in the system is moved with each pulse, and a greater separation is provided between the loading and regeneration sections of the system. The system is operated with the resin moving upwardly in a completely filled loading column, and with the resin moving downwardly in the partially filled regeneration compartments. No means is provided for precisely metering the resin increments transferred between the different compartments of the system.

More recently, an improved folded bed ion exchange system has been disclosed in Carlson U.S. Pat. Nos. 4,208,904 and 4,228,001. In this system, separate vertically-extending columns are provided for the loading and regeneration operations, and separate receivers are provided in each of the circuits between the loading and regeneration columns. Both of the columns are provided with freeboard spaces above the tops of the resin beds therein, the level being controlled by spill-over type outlets through which the resin is transferred to its respective receiver. Both columns are operated with the incoming increments of resin introduced into the bottoms of the columns and moving upwardly in the columns to the top outlets. Liquid is added to the resin increments to facilitate their transfer as slurries of the resin granules. No means is provided for precise metering of the volume of the transferred resin increments, nor any means for balancing the increments transferred from or to the loading column in relation to the resin increments transferred from or to the regeneration column.

A further improvement in folded bed ion exchange systems is disclosed in the pending patent application of Harold N. Hedrick and Solon G. Whitney, Ser. No. 275,658, filed June 22, 1981, now U.S. Pat. No. 4,385,993 which is co-owned with the present application and for which the issue fee has been paid. The corresponding European Patent Application has been published under EPA Publication No. 0068413. This system utilizes separate treatment and pulse chambers between the columns in which each portion of the circuit, and operates with the columns completely filled with compacted resin granules. The introduction of pulsed increments of granules into the bottoms of the loading and stripping columns expells increments of corresponding volume from the tops of the columns. Therefore, the volume of resin pulsed into the bottom of each column is subject to separate control, but no means is provided for precisely controlling the volumes of resin transferred in each pulse, nor is any means provided for balancing the resin increments transferred to each part of the circuit.

THE PROBLEM

In the experimental development of control systems for moving folded bed ion exchange systems, it has been found that there is a significant variation in the volumes occupied by a given quantity of resin granules in different portions of the system. The resin granules swell or shrink and therefore occupy a greater or lesser volume depending on the ionic strength and/or acid concentration, which changes to a great extent between the loading and regeneration sections of the system, and also to a significant extent between the lower and upper portions of each of the columns. Therefore, there is need to provide means for more precisely metering the volumes of resin increments expelled from the tops of the columns for transfer between the loading and stripping columns, and also providing for a predetermined selective adjustment of such volumes, thereby balancing the resin increments transferred from the loading side as compared with the regeneration side of the system, and also with respect to the individual columns. The desired objective is to provide for finely tuned precisely metered and balanced operation of the entire system with the same total amount of resin being continuously moved around the system.

SUMMARY OF INVENTION

The present invention in its method and apparatus aspects utilizes a metering chamber of novel construction and operation. The metering chamber which has a resin inlet communicating with the lower portion thereof is provided with a screen disposed across the interior of the chamber at a level above the lower portion. The screen is designed to permit liquid to pass therethrough while retaining the resin granules forced thereagainst. It has been discovered that when the granules being passed into the measuring chamber under hydraulic pressure contact the screen that the liquid being transferred with the granules passes through the screen to a level thereabove and that simultaneously the pressure in the liquid below the screen increases. In effect, a back pressure is created which can be sensed downstream of the screen, such as within the metering chamber, the column from which the resin is being transferred, or the pulse chamber in communication with the column. Alternatively or additionally the liquid level above the screen can be sensed, and either this liquid level or the pressure increase, or both, can be used as a signal to stop the transfer of resin into the metering chamber. With this cut-off, the metering chamber will captivate a packed precisely measured volume of the resin granules.

In preferred embodiments, the metering chamber is provided with a flexible wall enclosing a portion of the interior of the metering chamber below the screen. By flexing the wall inwardly or outwardly the volume of the metering chamber can be selectively decreased or increased. The position of the flexible wall is controlled by providing a hydraulic pressure generating means arranged to act against the outside of the wall for positioning the wall to provide a preselected variable volume in the metering chamber. More specifically, a predetermined pressure differential is created across the flexible wall with reference to the hydraulic pressure of the liquid within the metering chamber and the hydraulic pressure of the liquid on the outside of the flexible wall. Thereby, the amount of inward or outward flexing of the wall can be predetermined and thereby variably preselect the volume of the metering chamber.

REFERENCE TO THE DRAWINGS

The method and apparatus of this invention is illustrated in a preferred embodiment in the accompanying drawing, in which FIG. 1 is a diagrammatic view of the relevant units of a moving folded bed ion exchange system, the units being shown diagramatically in elevation; and FIG. 2 is an enlarged elevational view of the metering chamber and receiving units of the system of FIG. 1, a portion of the metering chamber being broken away to more clearly show the internal construction.

DETAILED DESCRIPTION

Figure 1:
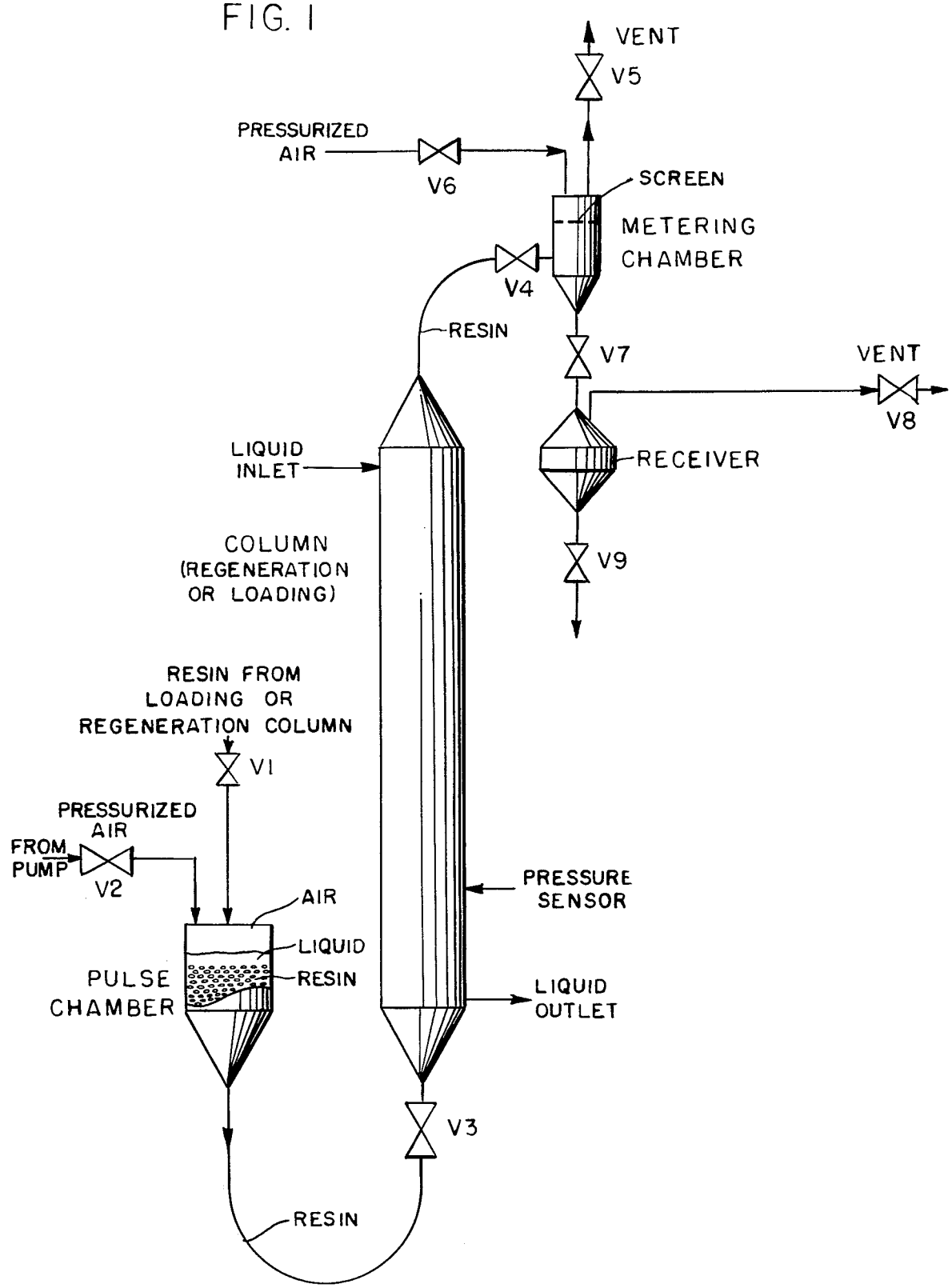

The present invention comprises a method and apparatus for metering the volume of liquid-containing increments of ion exchange resin granules expelled from one end portion of a column, such as the loading column or regeneration column, in a moving folded bed ion exchange system. Although not limited thereto, the method and apparatus of the present invention is preferably utilized in combination with the method and apparatus for folded bed ion exchange systems described in co-pending U.S. application Ser. No. 275,658. (See published European Patent Application Publication No. 0068413.) The loading and regeneration columns in such a system are operated completely filled with compacted resin granules, and the resin beds will contain liquid within and between the granules, that is, the compacted granule beds will also be completely filled with the liquid present in that portion of the system. The resin employed may be a cation exchange resin or an anion exchange resin depending on the purpose for which the system is used. Depending on the kind of resin employed, cations or anions will be adsorbed from the aqueous liquid being treated in the loading columns. The adsorbed ions will be stripped from the resin granules and the resin restored to the condition required for further use in the loading columns by contact with aqueous regenerating liquids in the regenerating columns. For example, where a cation exchange resin is employed for removing metal ions from an aqueous acidic solution, such as aqueous phosphoric acid, another strong acid such as aqueous sulfuric acid may be used as the regenerating solution, the metal ions being replaced by hydrogen ions, and the resin in hydrogen form being returned to the loading column.

In the preferred embodiments, compacted resin is introduced by hydraulic pulsing into the lower portions of the loading and stripping columns, which being completely filled with compacted resin, causes corresponding volumes of resins to be expelled from the upper portions of the columns. The ionic concentration of the liquids in the loading columns will increase from the lower portion of the columns to their upper portions, the feed liquor having the highest ion concentration being introduced into the upper portions of the loading columns and the deionized product liquid being removed from the lower portions of the loading columns. Similiarly, the regenerating solutions will be introduced into the upper portions of the regenerating columns and the spent regenerating liquids removed from the bottoms of the regenerating columns, and there will be an increase in ionic strength and/or acid concentration from the bottom portions to the top portions of the regeneration columns. These varying conditions will affect the relative volumes occupied by the same weight quantities or the same numbers of granules of the resin. The resin granules swell or shrink because of the different ion or acid concentrations.

In preferred embodiments of the present invention, packed liquid-containing resin granules are transferred under hydraulic pressure into a column filled with compacted liquid-containing resin, such as a vertically-extending loading or stripping column in a moving folded bed ion exchange system. The granules are introduced into the column through a resin inlet in the lower portion thereof while simultaneously expelling packed liquid-conatining resin from the column through a resin outlet in the upper portion of the column. The expelled resin granules are passed into a lower portion of an upwardly-extending metering chamber under the action of the hydraulic pressure-providing pulse. The metering chamber is provided with a granule-restraining screen disposed thereacross at a level above the lower portion. The screen has a mesh size permitting liquid to pass there-through into an upper portion of the chamber. The term "screen" as used herein is intended to refer not only to woven mesh screens, but also to equivalent devices such as sieve plates, which provide perforations through which liquid can pass, but which are of sufficiently small size to retain the resin granules.

The hydraulic pulses continue with the forcing of granules into the metering chamber until the granules reach the level of the underside of the screen and are compacted thereagainst. At this time, liquid is passed through the screen to a level thereabove. The compaction of the resin granules against the screen and the forcing of the liquids through the screen combines to produce an increased liquid pressure below the screen which is transferred through a continuous liquid phase all the way back to the pulse chamber. The increased pressure can therefore be sensed by an appropriate pressure sensor in the metering chamber below the screen, or in the column, or in the pulse chamber. This increase in pressure will also occur at a time when the liquid has reached a level above the screen, which liquid level can also be sensed by an appropriate liquid level sensor. Either the increased pressure, or the liquid level, or both may be employed as a signal for terminating the transfer of resin to the metering chamber. More specifically, the signal may be utilized to stop the operation of the pump supplying the hydraulic pressure to the pulse chamber. The metering chamber will thereby contain a precisely measured packed increment of the resin granules. This increment can then be transferred to another unit in the folded bed system, such as a treatment chamber located ahead of the pulse chamber and connected to the next column in the circuit. Such arrangements of the general system are described in greater detail in the above-cited U.S. patent application Ser. No. 275,658 and in the corresponding published European Patent Application No. 0068413.

In preferred embodiments, the metering chamber below the screen is provided with a flexible wall portion which can be flexed inwardly or outwardly to respectively decrease or enlarge the volume of the chamber below the screen. The flexible wall is positioned during the metering of the resin by applying hydraulic pressure to the outside of the wall to provide a pressure differential thereacross which will predetermine the flexed position of the wall when the chamber is filled with the granules. This arrangement thereby permits the metered volume of the granules to be selectively varied and predetermined. If desired in presently less preferred embodiments, the flexing wall arrangement for varying the internal volume of the metering chamber may be employed with a metering chamber without a resin-retaining screen, which chamber is completely filled with the resin to provide the desired metering.

In presently preferred embodiments, the metering method and apparatus described is employed in conjunction with both the loading and regeneration columns, which extend vertically and have bottom inlets and top outlets. In a typical use of the system, such as in the removal of metal ions from aqueous phosphoric acid, aqueous acidic solutions are passed downwardly through the compacted resin beds in both the loading and regeneration columns. For example, the solution being treated in the loading column may comprise wet process phosphoric acid prepared from phosphate rock, and the aqueous acidic solution in the regeneration column may comprise concentrated sulfuric acid. In such embodiments, the same weight amounts of the packed resin granules will occupy different volumes in the respective opposite end portions of the columns due to the shrinkage or swelling of the individual granules as they move through the columns. Further, the same quantities by weight or number of the granules will occupy different volumes as expelled from the loading columns as compared with the same volume when expelled from the regeneration columns.

In a preferred design of the metering chamber, the flexible wall thereof is in the form of a tubular sleeve, and a rigid housing is provided around the outside of the sleeve to provide a hydraulic pressure annulus. The annulus is connected to a source of liquid under a predetermined hydraulic pressure is connected to the annulus, thereby providing a means for creating a predetermined pressure differential across the flexing sleeve for selectively decreasing or increasing the volume of the metering chamber.

FLOW SHEET EXAMPLE

The method and apparatus of this invention is further illustrated by the accompanying drawings, which provide a flow sheet example. In the drawings, the principal units of the system have been labeled and flow arrows provided.

Looking first at FIG. 1 there is shown a section of a moving folded bed ion exchange system, which may be on either the loading side or stripping side of the system. In preferred embodiments, the arrangement shown is duplicated on both sides of the system, that is, it is used in combination with both the regeneration and loading columns.

In the embodiment of FIG. 1, there is shown a pulse chamber which is connected by a conduit to the bottom of a conical lower end of a vertically-extending column, which may be either a regenerating or loading column, as indicated. The upper conical end of the column discharges to a conduit connected to the lower portion of a metering chamber. As shown in FIG. 1, the metering chamber has a conical bottom portion which discharges through a conduit to a receiver. A preferred design of a metering chamber is shown in more detail in FIG. 2.

In the operation of the method and apparatus of FIG. 1, a body of compacted resin granules is contained in the lower portion of the pulse chamber, as illustrated. As shown, a level of liquid may be provided above the settled resin, and an air space thereabove. It will be understood that the resin in the pulse chamber has been previously introduced thereto from a loading or regeneration column. For example, the liquid-containing resin granules may be transferred through a resin handling valve V1 and introduced through a conduit into the top of the pulse chamber. The pulse chamber may contain or be provided with additional liquid. At the stage of transfer from the pulse chamber, the resin therein will be in compacted condition and will be filled with liquid, which preferably corresponds in composition to the liquid which will be present in the bottom portion of the column. The column will be provided with valve-controlled liquid inlets for passing the liquid to be treated or the regenerating liquid downwardly through the column, as indicated.

With valve V1 closed and valves V3 and V4 open, a hydraulic pulse is created by introducing pressurized air from an electrically operated pump through valve V2 into the top of the pulse chamber, thereby creating air pressure on the liquid and forcing compacted resin out of the bottom of the pulse chamber and into the bottom of the column. At the same time, compacted resin is forced out of the top of the column through valve V4 into the metering chamber until it fills the metering chamber to the level of the screen. During this transfer, vent valve V5 is open and air inlet valve V6 is closed. Valve V7 on the bottom outlet line from the metering chamber is also closed. It will be understood that all of the valves in the resin circuit, such as valves V4 and V7 are resin-handling valves.

When the resin in the metering chamber reaches the level of the screen and is retained thereby, a signal is actuated, as will subsequently be described in greater detail which shuts off the air pressure pump supplying the pressurized air to the pulse chamber. This terminates the introduction of the resin granules into the metering chamber. The captivated measured resin volume within the metering chamber can then be transferred to a subsequent unit of the system, such as the receiver shown in FIG. 1. For this purpose, the vent valve V5 is closed and the pressurized air inlet valve V6 is open, as is the resin transfer valve V7. With the arrangements shown, the measured resin increment will drop downwardly from the metering chamber to the receiver under the influence of gravity, but it is preferred to assist the transfer by the introduction of pressurized air in the space above the screen. During the transfer to the receiver, the outlet valve V9 from the receiver is closed, and the vent valve V8 from the upper portion of the receiver is open. Although not shown, it will be understood that a valve controlled inlet for pressurized air may be connected to the upper portion of the receiver for use in assisting the transfer of resin from the receiver to a subsequent unit in the system through valve V9, such as another pulse chamber like that shown in FIG. 1, which will be connected to the bottom of the next column in the system, and which in turn will be connected to another metering chamber like the one described with reference to FIG. 1.

Looking now at FIG. 2, there is shown a preferred design of the metering chamber. In the embodiment shown, the metering chamber consists of a vertically-extending cylinder 10 having a lower enlarged annular portion 11 which connects to a reduced neck portion 12. The conduit from the top of the column connects to the resin handling valve V4 into the side of the tubular neck portion 12. Within the annular portion 11 and spaced inwardly therefrom, there is provided a flexible sleeve 12. The flexible sleeve 12 is liquid-retaining and is hermedically sealed at its ends to the inside of the wall of the metering chamber. Annulus 11 provides a rigid housing around the sleeve 12 which encloses the hydraulic pressure annulus 13. The pressure annulus is connected to a source of liquid supplied under a controlled predetermined pressure. In the illustration given, this is provided by a gauge tube 14 which has a liquid level in the lower portion thereof, the liquid extending through the valve controlled line V11 to the liquid filling the annulus 13. An air pressurizing space is provided within the gauge tube 14 above the liquid level. The upper end of the gauge tube is connected to a source of pressurized air through valve V13. The line connecting to the top of the gauge tube 14 also communicates through valve V12 with an air vent. With the arrangement shown, the liquid level within the gauge tube 14 can be selectively positioned by introducing pressurized air through valve V13 with valve V12 closed to lower the liquid level, or by venting air through valve V12 with valve V13 closed.

At an intermediate level within the cylinder 10 there is provided a horizontally-extending screen 15. This screen may be formed of a fine mesh wire screen or may be in the form of a sieve plate. The perforations in the wire screen or sieve plate are of smaller diameter than the diameter of the resin granules, so that the resin granules are retained below the screen, as shown in FIG. 2.

The upper end of the cylinder 10 which provides the measuring chamber, may be connected to valve V5 to an air vent, and a source of pressurized air may be connected to the top of the cylinder through valve V6. There is also preferably provided a level sensor device having a level probe 16 extending to a position above the screen 15.

As shown in FIG. 2, there may be provided below the metering chamber a receiver through which resin may be transferred from the metering chamber, discharging through neck portion 12 and valve V7 into the top of the receiver, which may be vented during the transfer through valve V8. An outlet is provided from the lower end of the receiver through valve V9.

In the operation of the metering chamber of FIG. 2, a predetermined pressure is applied to the fluid in the annulus 13 around the flexing wall 12. To accomplish this result, the liquid in gauge 14 is positioned and maintained at a selected level, pressurized air being introduced through valve 13 or removed through valve V12, as required to establish the level. Liquid-containing resin transferred from the column through valve V4 into the neck portion 12 and upwardly into the interior of the metering chamber, the lower portion of which is provided by the flexing sleeve 12. As the pulsed resin fills the interior of the metering chamber the pressure of the internal liquid acts against the inside of the flexing sleeve 12 establishing a pressure differential thereacross. If this pressure differential is negative in an outward direction, the tubular sleeve 12 will be flexed inwardly as shown in FIG. 2, or if the pressure differential is positive in an outward direction, it will be flexed outwardly, thereby selectively either decreasing or enlarging the volume within the metering chamber into which the resin granules are transferred. The position of the flexible liner (12) is held by closing valve (V11) since the fluid is incompressible.

The pulse rapidly fills the metering chamber up to the level of the screen 15. The screen retains the resin so that it is compacted thereagainst by the force of the pulse, but the liquid transferred with the resin granules moves through the screen to a level thereabove, as shown in FIG. 2. That level may be selected to correspond with the amount of liquid forced through the screen when the resin granules are fully compacted against the screen. When that liquid level is reached, the bottom of the probe of the level sensor 16 will be contacted, and this contacting can be used as a signal to actuate a shut-off switch for the pump supplying the hydraulic pulse pressure to the pulse chamber and column, as described in connection with FIG. 1.

When the resin granules are compacted against the screen 15 and the liquid has reached a level thereabove, there will be a sudden increase in the liquid pressure below the screen 15, which will travel as a back pressure through the continuous liquid phase in the column and pulse chamber. This sudden increase in pressure may be sensed by an appropriate pressure sensor, and also used as an alternative or additional signal for actuating a shut-off switch on the pump supplying the pressurized air to the top of the pulse chamber. For example, a pressure sensor device may be installed in the side of the column, as indicated in FIG. 1. If the pressurized fluid supplied to the top of the pulse chamber is a liquid instead of air, the same liquid level signal or increased pressure signal may be used for turning off the pump supplying the pressurized liquid.

With regard to specific details of construction, it will be apparent that these may be varied widely. The flexible sleeve 12 in general should be formed of a flexible, resilient material which has a high resistance to attack by the liquid being transferred with the resin, which may be wet process phosphoric acid, concentrated sulfuric acid, etc. For example, a suitable material for the flexing sleeve 12 and such applications is hypalon. With a cation exchange resin granules having an average granule size of 30 mesh, a screen may be employed having a mesh size of 50 mesh (American Standard Screen). A suitable level sensor is Levelite, an optical sensor manufactured by Genelco, Inc., Dallas, Tex., and the lower end of the liquid level probe may be located at 4 inches above the top of the screen. A suitable pressure sensor may be connected to the column, as shown in FIG. 1, such as an "Econ-O-Trol" pressure switch supplied by Delaval Turbine, Inc., Barksdale Controls Division, Los Angeles, Calif.

We claim:

1. In a moving folded bed ion exchange system, the method of metering the volume of liquid-containing increments of ion exchange resin granules expelled from one end portion of a column, said column having a resin inlet to said one end portion and a resin outlet from its opposite end portion and being completely filled with compacted resin granules containing liquid within and between the granules, including the step of transferring under hydraulic pressure, packed liquid-containing resin granules into said column through said resin inlet while simultaneously expelling packed liquid-containing resin from said column through said resin outlet, wherein the improvement comprises:
    (a) passing said expelled resin granules under said hydraulic pressure into a lower portion of an upwardly-extending metering chamber, said chamber having a granule-retaining screen disposed thereacross at a level above said lower portion, said screen permitting liquid to pass therethrough into an upper portion of said chamber;
    (b) continuing to pass said granules into said chamber until said granules reach the level of the underside of said screen and are compacted thereagainst, liquid having passed through said screen to a level thereabove;
    (c) sensing as a control signal the height of the liquid level above said screen, and/or the increased liquid pressure below said screen caused by the compaction of said granules against said screen, and using said signal to stop the application of hydraulic pressure for passing granules into said chamber, whereby said chamber contains a precisely measured packed increment of resin granules; and
    (d) transferring said measured increment to another unit in said moving folded bed ion exchange system.

2. The method improvement of claim 1 in which said metering chamber below said screen is provided with a flexible wall portion which can be flexed inwardly or outwardly to respectively decrease or enlarge the volume of said chamber below said screen, and positioning said flexible wall during the metering of the resin in said chamber by applying hydraulic pressure to the outside of said wall to provide a pressure differential thereacross which predetermines the flexed position of said wall when said chamber is filled with said granules, and thereby permits the metered volume of said granules to be selectively varied.

3. The method of claim 2 in which said column is a vertically-extending, resin loading or resin regeneration column in which said resin is contacted with an aqueous acidic solution which is passed downwardly through the packed granules in said column, the same weight amounts of said packed granules occupying a different volume in the respective opposite end portions of said column due to the shrinkage or swelling of the individual granules as they move through said column.

4. The method of claim 1 in which said column is a vertically-extending, resin loading or resin regeneration column in which said resin is contacted with an aqueous acidic solution which is passed downwardly through the packed granules in said column, the same weight amounts of said packed granules occupying a different volume in the respective opposite end portions of said column due to the shrinkage or swelling of the individual granules as they move through said column.

5. A resin granule metering apparatus for use in a moving folded bed ion exchange system, comprising:
    (a) an upwardly-extending metering chamber having a resin inlet communicating with the lower portion thereof;
    (b) a screen disposed across the interior of said chamber at a level above said lower portion, said screen permitting liquid to pass therethrough while retaining resin granules forced thereagainst;
    (c) a flexible wall enclosing a portion of the interior of said metering chamber below said screen, said wall respectively decreasing or increasing the volume of said chamber below said screen when flexed inwardly or outwardly;
    (d) hydraulic pressure generating means arranged to act against the outside of said wall for positioning said wall to provide a preselected variable volume in said metering chamber;
    (e) means for transferring liquid-containing resin granules into said metering chamber below said screen; and
    (f) means for stopping said transfer when said granules become compacted against said screen.

6. The metering apparatus of claim 5 in which said flexible wall is in the form of a tubular sleeve, a rigid housing is provided around the outside of said sleeve to provide a hydraulic pressure annulus, and a source of liquid under a predetermined hydraulic pressure is connected to said annulus.

* * * * *